United States Patent
Kotwicki et al.

Patent Number: 6,125,830
Date of Patent: Oct. 3, 2000

[54] FLOW MEASUREMENT AND CONTROL WITH ESTIMATED MANIFOLD PRESSURE

[75] Inventors: Allan Joseph Kotwicki, Williamsburg; John David Russell, Farmington Hills, both of Mich.

[73] Assignee: Ford Global Technologies, Dearborn, Mich.

[21] Appl. No.: 09/332,434

[22] Filed: Jun. 14, 1999

[51] Int. Cl.[7] ................................................ F02M 25/07
[52] U.S. Cl. ........................................................ 123/568.21
[58] Field of Search .......................... 123/568.11, 568.14, 123/568.16, 568.17, 568.18, 568.21, 568.23, 568.24, 568.25, 568.26, 568.27, 568.28

[56] References Cited

U.S. PATENT DOCUMENTS

| | | | |
|---|---|---|---|
| 4,290,404 | 9/1981 | Hata et al. | 123/478 |
| 4,390,001 | 6/1983 | Fugimoto | 123/568.2 |
| 4,406,161 | 9/1983 | Locke et al. | 73/118.1 |
| 4,428,354 | 1/1984 | Sundeen et al. | 123/568.28 |
| 4,562,744 | 1/1986 | Hall et al. | 73/861.02 |
| 5,190,017 | 3/1993 | Cullen et al. | 123/568.16 |
| 5,241,940 | 9/1993 | Gates, Jr. | 123/568.27 |
| 5,347,843 | 9/1994 | Orr et al. | 73/1.34 |
| 5,515,833 | 5/1996 | Cullen et al. | 123/568.27 |
| 5,542,395 | 8/1996 | Tuckey et al. | 123/497 |
| 5,577,484 | 11/1996 | Izutani et al. | 123/568.16 |
| 5,586,539 | 12/1996 | Yonekawa et al. | 123/497 |
| 5,613,479 | 3/1997 | Gates et al. | 123/568.27 |
| 5,819,709 | 10/1998 | Holmes et al. | 123/497 |
| 5,848,583 | 12/1998 | Smith et al. | 132/497 |
| 5,921,224 | 7/1999 | Sinnamon | 123/568.21 |
| 5,988,149 | 11/1999 | Gates | 123/568.21 |

OTHER PUBLICATIONS

"Experimental Methods for Engineers" J.P. Holman, pp. 184–236, Second Edicition, McGraw–Hill Book Company, no date.

"The Internal–Combustion Engine in Theory and Practice", vol. I: Thermodynamics, Fluid Flow, Performance, Second Edition, Revised, The MIT Press, by C. f. Taylor, no date.

*Primary Examiner*—Willis R. Wolfe
*Attorney, Agent, or Firm*—Jerome R. Drouillard

[57] ABSTRACT

An exhaust gas recirculation systems directs exhaust gasses from an exhaust manifold to an intake manifold of an internal combustion engine. The exhaust gasses travel from the exhaust manifold, first passing through a flow control valve and then through a measuring orifice before entering the intake manifold. Pressure difference across the orifice is used, along with estimated manifold pressure from a mass air flow sensor, to measure and control exhaust gas flow.

21 Claims, 4 Drawing Sheets

FLOW MEASUREMENT AND CONTROL WITH ESTIMATED MANIFOLD PRESSURE

FIELD OF THE INVENTION

The present invention relates to a system and method to measure and control gas flow using a differential pressure measurement across an orifice, and in particular to measurement of exhaust gas recirculation flow with a flow control valve upstream of the orifice.

BACKGROUND OF THE INVENTION

Engine control systems require accurate control of exhaust gas recirculation (EGR) for controlling regulated emissions and achieving fuel economy improvements. One type of exhaust gas recirculation system externally recirculates exhaust gas from an exhaust manifold to an intake manifold with a flow control valve placed in the flow path between the exhaust manifold and the intake manifold. Typically, the valve is pneumatically operated and controlled by an electronic engine controller.

One approach to controlling exhaust gas recirculation flow is to use a feedback variable to assure that actual exhaust gas recirculation flow converges to a desired exhaust gas recirculation flow. One method is to use a differential pressure measured across an orifice in the exhaust flow path upstream of the flow control valve. Then, differential pressure can be used to infer the actual exhaust gas recirculation flow. The differential pressure measurement provides a correlation to exhaust flow using the principle that exhaust pressure varies only slightly in the region where EGR is utilized. Using this approach, temperature effects can be accounted for by correlating upstream exhaust manifold temperature to engine operating conditions, or ignored due to relatively small variations. Finally, an error between the actual and desired exhaust gas recirculation flow is used to create a control signal that is sent to the flow control valve. Thus, the system can compensate for the effects of engine and component aging, as well as other errors in the system. Such a system is disclosed in U.S. Pat. No. 5,190,017.

The inventors herein have recognized a disadvantage with the above system when the orifice is placed downstream of the valve. In this configuration, flow from the exhaust travels first through a flow control valve and then through the orifice before entering the intake manifold. In this case, pressure upstream of the orifice (downstream of the valve) varies widely and assumptions made regarding differential pressure and flow are no longer valid. Also, temperature upstream of the orifice (downstream of the valve) is no longer correlated directly to engine operating conditions due to flow expansion in the valve. Thus, there is a significant measurement error when using a differential pressure measurement with a downstream orifice.

SUMMARY OF THE INVENTION

An object of the invention claimed herein is to provide an exhaust gas recirculation measurement system and method for an exhaust gas recirculation system preferably having an upstream flow control valve and a downstream measuring orifice that uses a relationship between flow, pressure differential, and downstream pressure without addition of a downstream pressure sensor.

The above object is achieved, and problems of prior approaches overcome, by a method for measuring exhaust gas recirculation flow from an engine exhaust to an engine intake manifold wherein the exhaust gas recirculation flow passes through a flow control valve and then through a fixed area orifice, the method comprising: generating a differential pressure signal indicating a differential pressure across the fixed area orifice; generating an estimated manifold pressure based on a total gas charge inducted into a cylinder; and calculating the exhaust gas recirculation flow based on said differential pressure signal and said estimated manifold pressure.

By using available sensors to estimate manifold pressure and then using this estimated manifold pressure as a correction to measured orifice differential pressure, a highly accurate flow measurement is obtained without additional hardware. In other words, because downstream pressure is manifold pressure, other sensors available on the engine can be used to estimate manifold pressure. The estimated manifold pressure can then be used in the exhaust gas recirculation flow calculation. Further by recognizing the effect of exhaust gas recirculation on manifold pressure, proper actions can be taken to avoid circular references.

An advantage of the above aspect of the invention is that more accurate feedback control of EGR is obtained.

Another advantage of the above aspect of the invention is that the more accurate feedback control quality yields better fuel economy and driveability.

Yet another advantage of the above aspect of the invention is decreased system cost.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

DESCRIPTION OF PREFERRED EMBODIMENT(S)

The present application is related to the following patent application to the same inventors which is co-owned by the same assignee: "Flow Measurement and Control," Ser. No. 09/227,844 filed Jan. 11, 1999.

Figure 1:
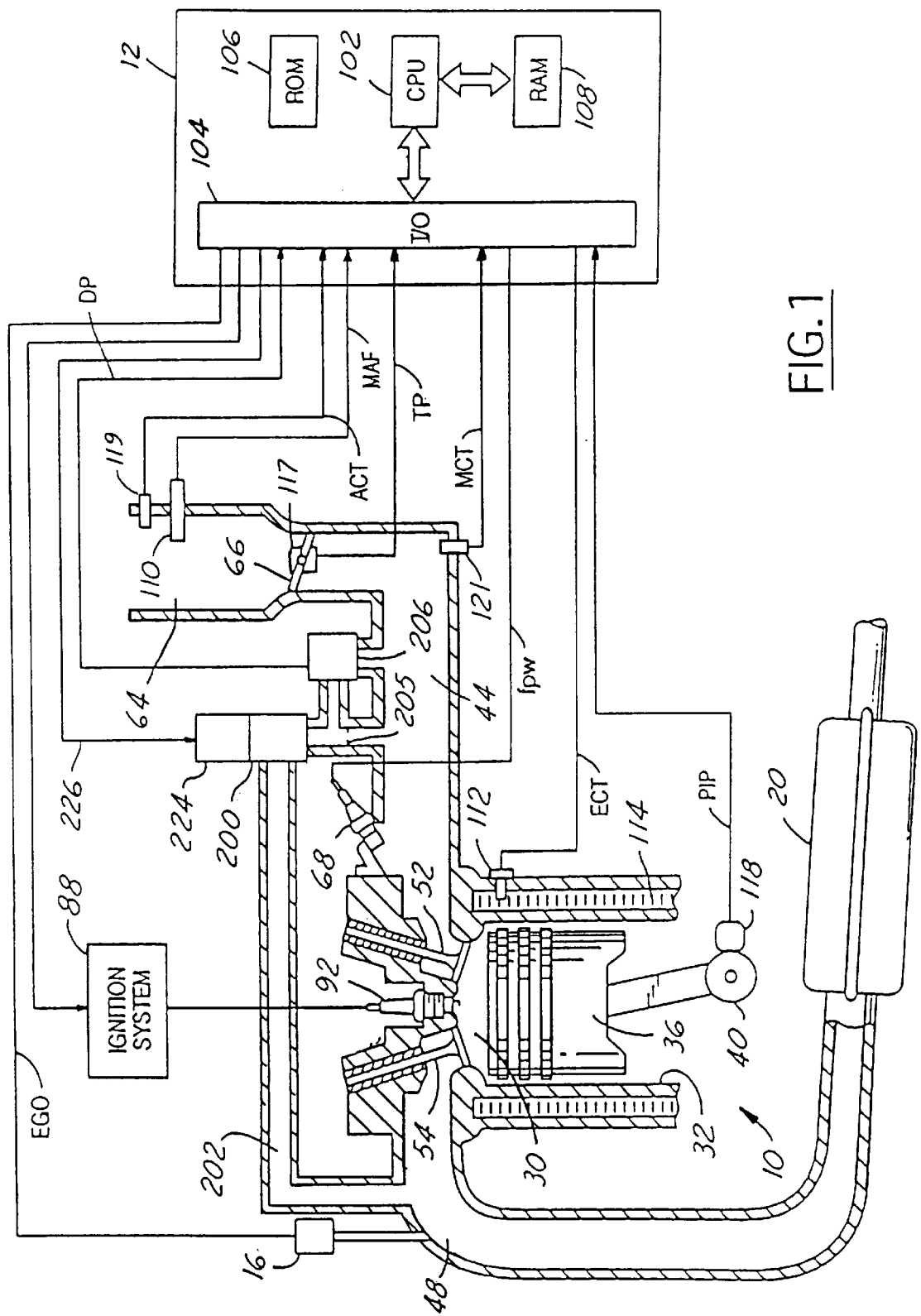
FIG. 1 is a block diagram of an engine in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of manifold charge temperature (MCT) from sensor 121; a measurement of air charge temperature (ACT) from sensor 119; and a profile ignition pickup signal (PIP) from Hall effect sensor 118 coupled to crankshaft 40 indicating and engine speed (N).

Exhaust gas is delivered to intake manifold 44 by a conventional EGR tube 202 communicating with exhaust manifold 48, EGR valve assembly 200, and EGR orifice 205. Alternatively, tube 202 could be a internally routed passage in the engine that communicates between exhaust manifold 48 and intake manifold 44. Flow Sensor 206 communicates with EGR tube 202 between valve assembly 200 and orifice 205. Flow sensor 206 also communicates with intake manifold 44. Stated another way, exhaust gas travels from exhaust manifold 48 first through valve assembly 200, then through EGR orifice 205, to intake manifold 44. EGR valve assembly 200 can then be said to be located upstream of orifice 205.

Flow sensor 206 provides a measurement of pressure drop (DP) across orifice 205 to controller 12. Signal DP is then used to calculated EGR flow as described later herein with particular reference to FIG. 2. EGR valve assembly 200 has a valve position (not shown) for controlling a variable area restriction in EGR tube 202, which thereby controls EGR flow. EGR valve assembly 200 can either minimally restrict EGR flow through tube 202 or completely restrict EGR flow through tube 202. Vacuum regulator 224 is coupled to EGR valve assembly 200. Vacuum regulator 224 receives actuation signal 226 from controller 12 for controlling valve position of EGR valve assembly 200. In a preferred embodiment, EGR valve assembly 200 is a vacuum actuated valve. However, as is obvious to those skilled in the art, any type of flow control valve may be used, such as, for example, an electrical solenoid powered valve or a stepper motor powered valve.

Figure 2:
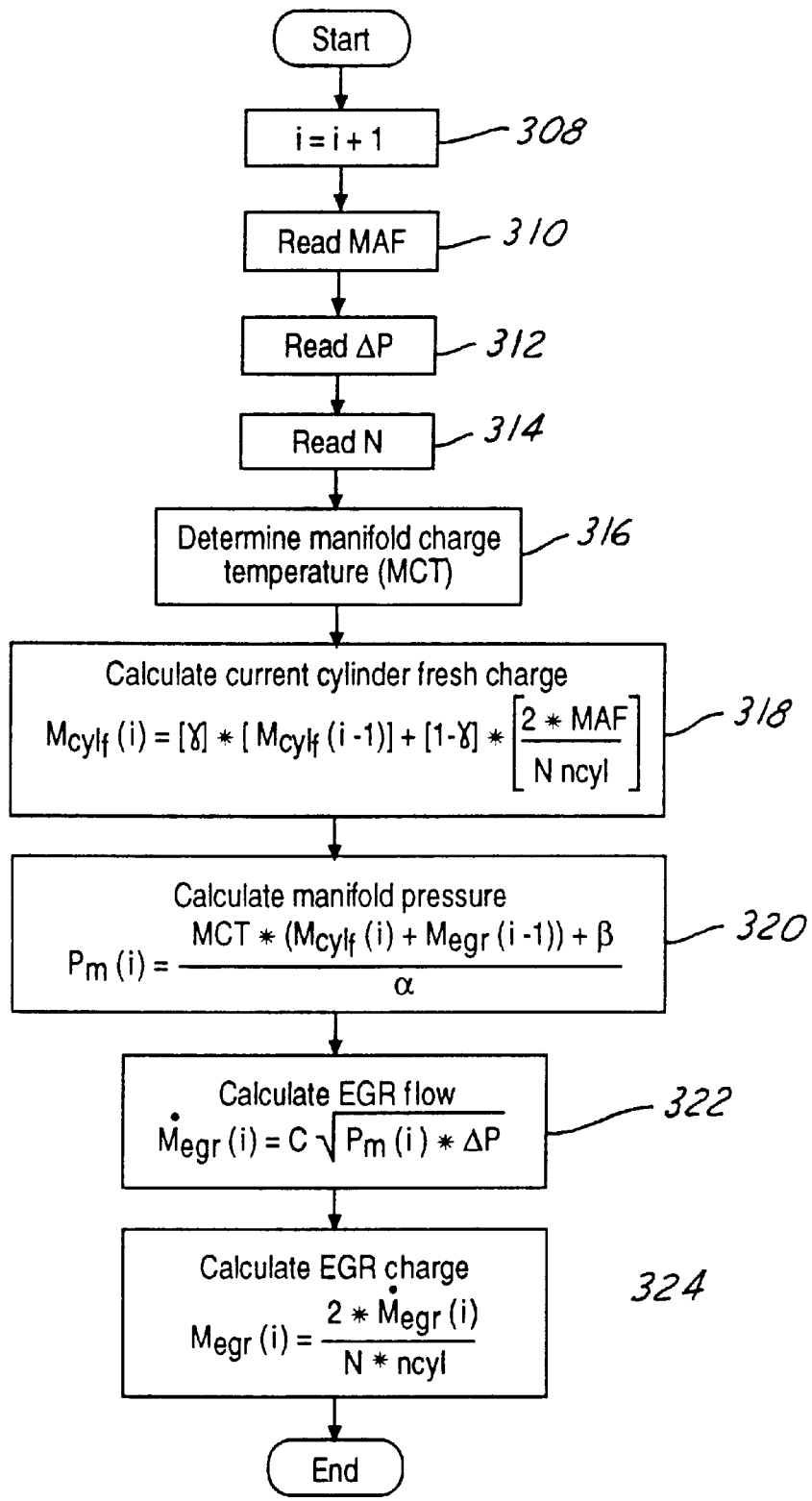
FIG. 2, 4 and 5 are a high level flowcharts of various routines for controlling EGR flow.

Referring now to FIG. 2, a method for measuring exhaust gas recirculation flow is described. First, in step 308, counter (i) is incremented. In step 310, fresh air mass flow entering the manifold is determined from signal MAF. Then, in step 312, differential pressure signal (Dp) is read indicating differential pressure across orifice 205. Then, signal N representing engine speed is determined from signal PIP in step 314. In step 316, manifold charge temperature (MCT) is determined from sensor 121. Alternatively, manifold charge temperature can be estimated from characteristic graphs of engine operating conditions such as, for example, engine speed, fresh air entering the manifold, temperature of fresh air entering the manifold, desired exhaust gas recirculation rate, ignition timing, and engine coolant temperature (ECT). For a specific example of a preferred embodiment, manifold temperature can be calculated based on a weighted average of fresh air temperature, exhaust gas recirculation flow temperature, where the weighting is based on the relative mass flow between the exhaust gas flow and fresh air flow. This calculated manifold temperature from weighted averages is modified based on heat transfer from the engine to the manifold gas contents. The heat transfer is proportional to the difference of engine coolant temperature (ECT) and the temperature of fresh air entering the manifold. This can be further modified based on mass flow rate of fresh air entering the manifold to account for varying heat transfer coefficients.

Continuing with FIG. 2, in step 318, the current value at step (i) of fresh air charge entering the cylinder (mcyl$_f$(i)) is determined by filtering the fresh air charge entering the manifold, where the filter coefficient, g, is determined as a function of engine speed. Variable ncyl represents the number of cylinders in the engine. For example, in an eight cylinder engine, ncyl=8. Then, in step 320, manifold pressure (pm) is calculated based on the fresh air charge entering the cylinder (mcyl$_f$(i)) at step (i), the manifold charge temperature (MCT), and a previously calculated EGR charge (megr(i−1)). The sum of the EGR charge and fresh charge constitute the total manifold charge that is used with the coefficients a and b. By using the previously calculated EGR flow, a circular reference is avoided, where it is necessary to know EGR flow to calculate the EGR flow. Coefficients a and b are determined as a function of engine speed and represent the correlation described later herein with particular reference to FIG. 3.

In an alternative embodiment, a rough estimate of the EGR flow is first obtained using measured differential pressure and engine speed directly. In this embodiment, a rough estimate of EGR charge is obtained using differential pressure divided by engine speed and multiplied by a calibration constant. This rough estimate can then be used instead of megr(i−1) in step 320 to obtain an estimate of manifold pressure, which is then used in step 322 to obtain a refined EGR flow.

In step 322, EGR flow at step (i) is calculated using differential pressure Dp and manifold pressure at step (i) calculated as described previously herein. Calibration constant C is predetermined based on engine testing and orifice 205 diameter. Finally, in step 324, EGR charge at step (i) is calculated from the EGR flow, engine speed (N), and the number of cylinders (ncyl). Thus, when the routine described by FIG. 2 repeats, the EGR charge just calculated will become the previously calculated EGR charge used in step 320 to allow proper estimation of manifold pressure. According to the present invention, accurate manifold pressure estimation is coupled with a more accurate EGR flow measurement method. Problems associated with requiring EGR flow to estimate manifold pressure, where manifold pressure is required to estimate EGR flow, are avoided. According to the present invention, both manifold pressure and EGR flow will converge to accurate values in a very short period, giving minimum errors during transients.

Figure 3:
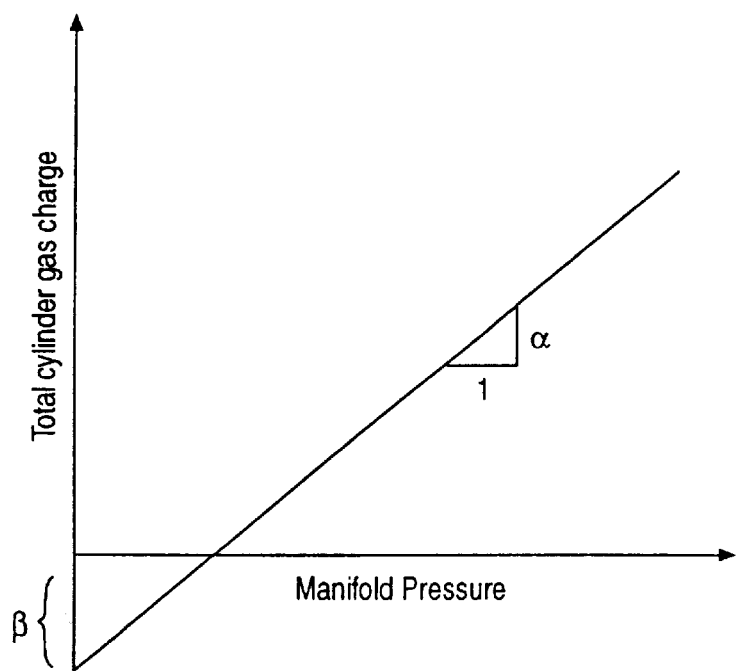
FIG. 3 is a graph showing an engine breathing line used in the present invention.

Referring now to FIG. 3, a graph representing the relationship between total cylinder gas charge and manifold pressure for a given manifold charge temperature and engine speed is shown. The offset on the y-axis is represented by the term b and the slope of the line is represented by the term a. This graph represents known breathing relationships for a naturally aspirated engine. The values a and b are used according to the present invention for estimating manifold pressure for use in determining EGR flow.

Figure 4:
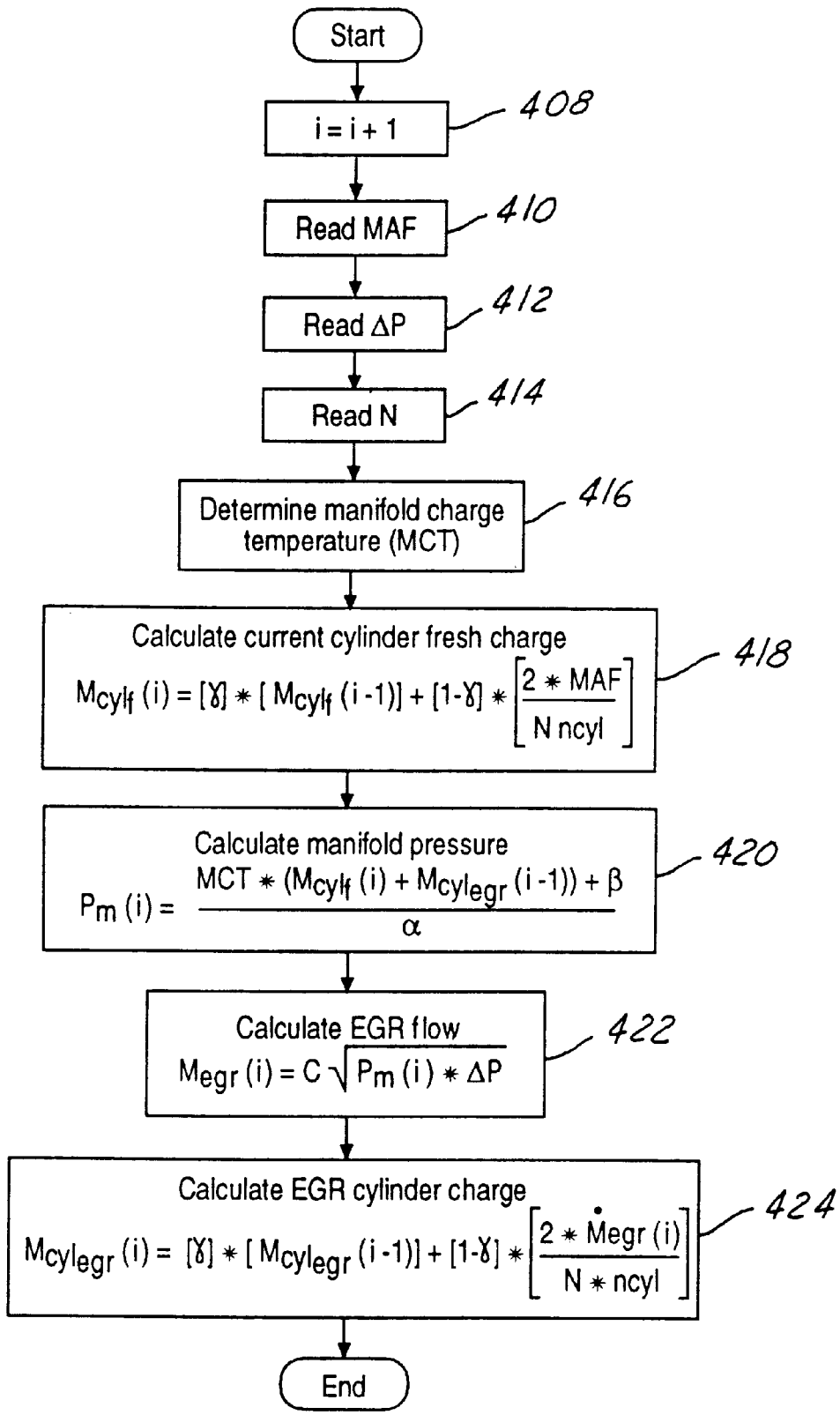

Referring now to FIG. 4, an alternate method for measuring exhaust gas recirculation flow is described. First, in step 408, counter (i) is incremented. Then, in step 410, fresh air mass flow entering the manifold is determined from signal MAF. Then, in step 412, differential pressure signal (Dp) is read indicating differential pressure across orifice 205. Then, signal N, representing engine speed is determined from signal PIP in step 414. In step 416, manifold charge temperature (MCT) is determined from sensor 121. Alternatively, manifold charge temperature can be estimated from engine operating conditions such as, for example, engine speed, fresh air entering the manifold, temperature of fresh air entering the manifold, desired exhaust gas recirculation rate, and ignition timing.

Continuing with FIG. 4, in step 418, the current value at step (i) of fresh air charge entering the cylinder ($mcyl_f(i)$) is determined by filtering the fresh air charge entering the manifold, where the filter coefficient, g, is determined as a function of engine speed. Then, in step 420, manifold pressure (pm) is calculated based on the fresh air charge entering the cylinder ($mcyl_f(i)$) at step (i), the manifold charge temperature, and a previously calculated EGR cylinder charge ($mcyl_{ECR}(i-1)$). Coefficients a and b are determined as a function of engine speed and represent the correlation described previously herein with particular reference to FIG. 3.

In step 422, EGR flow at step (i) is calculated using differential pressure Dp and manifold pressure at step (i) calculated as described previously herein. Calibration constant C is predetermined base on engine testing and orifice 205 diameter. Finally, in step 424, EGR cylinder charge at step (i) is calculated from the EGR flow, engine speed (N), the number of cylinders (ncyl), and filter coefficient g. Thus, EGR flow is filtered as well as fresh air measured by the airflow sensor to account for filling and emptying dynamics of the intake manifold.

Figure 5:
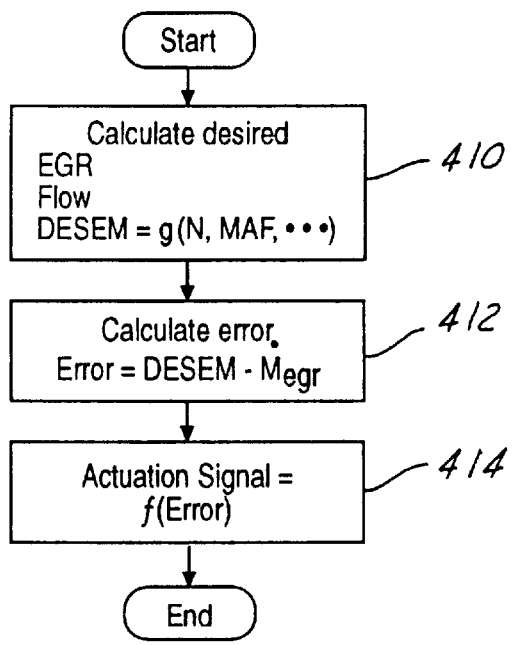

Referring now to FIG. 5, a routine for controlling EGR flow is described. In step 410, the desired EGR flow, DESEM, is calculated as a function of engine operating conditions that include engine speed (determined from signal PIP) and airflow (MAF). Then, the value of EGR flow calculated according to either FIG. 3 or 4 is subtracted from DESEM to create an error signal, ERROR. Then, in step 414, actuation signal 226 is calculated as a function (f) of signal ERROR. In a preferred embodiment, function (f) represents a PID controller. Alternatively, function (f) may represent any type of feedback or feedforward controller known to those skilled in the art.

This concludes the description of the Preferred Embodiment. The reading of it by those skilled in the art would bring to mind many alterations and modifications without departing from the spirit and scope of the invention. Accordingly, it is intended that the scope of the invention be limited by the following claims.

We claim:

1. A system for controlling an exhaust gas recirculation flow from an engine exhaust to an engine intake manifold, the system comprising, a flow control valve through which the exhaust gas recirculation flow passes after exiting the exhaust;

a fixed area orifice through which the exhaust gas recirculation flow passes after exiting said flow control valve before entering the engine intake manifold; and a controller for generating a differential pressure signal indicating a differential pressure across the fixed area orifice, the controller generating an estimated manifold pressure based on a total gas charge inducted into the cylinder, calculating an exhaust gas recirculation flow based on said differential pressure signal and said estimated manifold pressure, the controller adjusting said valve based on said calculated exhaust gas recirculation flow and a desired exhaust gas recirculation flow.

2. The system recited in claim 1 wherein said controller further calculates said total gas charge inducted into the cylinder based on an airflow entering the engine intake manifold and a temperature of the total gas charge.

3. The system recited in claim 2 wherein said computer further calculates said total gas charge based on a previously calculated exhaust gas recirculation flow.

4. A method for measuring exhaust gas recirculation flow from an engine exhaust to an engine intake manifold wherein the exhaust gas recirculation flow passes through a flow control valve and then through a fixed area orifice, the method comprising;

generating a differential pressure signal indicating a differential pressure across the fixed area orifice;

generating an estimated manifold pressure based on a total gas charge inducted into a cylinder; and calculating the exhaust gas recirculation flow based on said differential pressure signal and said estimated manifold pressure.

5. The method recited in claim 4 wherein said step of generating said estimated manifold pressure further comprises the steps of:

determining individual gas flow temperatures entering the manifold generating a temperature of said total gas charge based on said individual gas flow temperatures and a plurality of engine operating conditions;

generating said estimated manifold pressure based on total gas charge inducted into the cylinder and said total gas charge temperature.

6. The method recited in claim 4 wherein said step of generating said estimated manifold pressure further comprises generating said total gas charge inducted into the cylinder based on an airflow entering the manifold and a previously calculated exhaust gas recirculation flow.

7. The method recited in claim 4 wherein said step of generating said estimated manifold pressure further comprises generating said total gas charge inducted into the cylinder based on a filtered flow entering the manifold and a previously calculated exhaust gas recirculation flow.

8. The method recited in claim 4 wherein said total gas charge inducted into the cylinder is based on an air flow entering the manifold through a throttle, said differential pressure signal, and an engine speed.

9. The method recited in claim 4 wherein said step of generating said estimated manifold pressure further comprises generating said total gas charge inducted into the cylinder based on a filtered flow entering the manifold and a filtered exhaust gas recirculation flow.

10. The method recited in claim 4 wherein said step of generating said estimated manifold pressure based on said total gas charge inducted into the cylinder further comprises generating said estimated manifold pressure based on the total gas charge inducted into the manifold.

11. The method recited in claim 4 wherein said step of generating said estimated manifold pressure further comprises generating said total gas charge inducted into the cylinder based on an airflow entering the manifold and said differential pressure signal.

12. The method recited in claim 11 wherein said airflow entering the manifold enters through a throttle.

13. A method for measuring exhaust gas recirculation flow from an engine exhaust to an engine intake manifold, the exhaust gas recirculation flow passing through a flow control valve and then through a fixed area orifice, the method comprising;

generating a differential pressure signal indicating a differential pressure across the fixed area orifice;

generating a total gas charge inducted into a cylinder based on an airflow entering the manifold and a previously calculated exhaust gas recirculation flow;

generating an estimated manifold pressure based on said total gas charge inducted into the cylinder and a total gas charge temperature; and calculating an exhaust gas recirculation flow based on said differential pressure signal and said estimated manifold pressure.

14. The method recited in claim 13 wherein said step of generating said estimated manifold pressure further comprises generating said total gas charge inducted into the cylinder based on an air flow entering the manifold through a throttle and said differential pressure signal.

15. The method recited in claim 13 wherein said step of generating a total gas charge inducted into the cylinder further comprises the step of generating said total gas charge inducted into the cylinder based on a filtered airflow entering the manifold, a previously calculated exhaust gas recirculation flow, and said total gas charge temperature.

16. The method recited in claim 13 wherein said total gas charge inducted into the cylinder is further based on said air flow entering the manifold through a throttle, said differential pressure signal, and an engine speed.

17. The method recited in claim 13 wherein said total gas charge inducted into the cylinder is further based on a filtered flow entering the manifold and a filtered exhaust gas recirculation flow.

18. The method recited in claim 13 further comprising the step of adjusting said flow control valve using said calculated exhaust gas recirculation flow.

19. The method recited in claim 13 further comprising the step of adjusting said flow control valve using said calculated exhaust gas recirculation flow and a desired exhaust gas recirculation flow.

20. The method recited in claim 13 wherein said step of generating said estimated manifold pressure further comprises the step of generating said total gas charge temperature based on a temperature measurement of airflow entering the manifold and a plurality of engine operating conditions.

21. The method recited in claim 20 wherein said engine operating conditions comprise an engine coolant temperature.

\* \* \* \* \*